United States Patent [19]
Esman et al.

[11] Patent Number: 5,495,366
[45] Date of Patent: Feb. 27, 1996

[54] APPARATUS AND METHOD FOR ELIMINATING POLARIZATION SENSITIVITY IN TRANSDUCERS

[75] Inventors: Ronald Esman, Burke; Irl N. Duling, III, Round Hill; Alan D. Kersey, Fairfax Station, all of Va.

[73] Assignee: The United States of America as represented by the Secretary of the Navy, Washington, D.C.

[21] Appl. No.: 68,470

[22] Filed: May 3, 1993

[51] Int. Cl.⁶ ........................................ G02B 5/30
[52] U.S. Cl. ........................... 359/495; 359/629
[58] Field of Search ................. 359/246, 485, 359/495, 629, 637, 638

[56] References Cited

U.S. PATENT DOCUMENTS 4,088,410  5/1978  Smith ........................... 356/163

FOREIGN PATENT DOCUMENTS 3132414  2/1983  Denmark ........................... 359/495

*Primary Examiner*—Georgia Y. Epps
*Assistant Examiner*—Thomas Robbins
*Attorney, Agent, or Firm*—Thomas E. McDonnell; Edward F. Miles

[57] ABSTRACT

An apparatus and method for converting a signal of arbitrary polarization to one of preselected polarization, e.g. for use by a sensor, transducer, etc. A signal splitter divides the input signal into its orthogonal linearly polarized components, and launches the components from a pair of output ports. The signals counterpropagate to the opposite port, and, while counterpropagating, are rotated into the same linear polarization state. In one embodiment, the rotation is done by a pair of complementary 45° Faraday rotators; in another, by one 90° rotator. In the former, the signal is recombined at the splitter in the initial state of polarization that in which the signal initially entered the splitter; in the latter, the recombined signal is of orthoconjugate polarization to the input signal.

16 Claims, 2 Drawing Sheets

APPARATUS AND METHOD FOR ELIMINATING POLARIZATION SENSITIVITY IN TRANSDUCERS

BACKGROUND OF THE INVENTION

This invention is concerned with altering signals, such as an optical carrier, according to various other signals and measurands of interest so that the signal or measurand of interest can be transmitted or measured.

In many sensing systems, most notably fiber optic ones, a sensing element modifies some characteristic of input optical signal by changing some parameter of the optical system. Sensing elements can either be constructed of fiber (intrinsic), or can be some external fiber-coupled transduction element (extrinsic). The performance of most sensing elements (e.g. transducers, modulators, etc.) depends on an appropriate state of polarization of the input light. The signal carried by the light from the sensor can be degraded or completely eliminated by an inappropriate input state of polarization, this fading being commonly known as polarization induced signal fading. Signal fading is encountered when a conventional low-birefringence single mode optical fiber is used to deliver the optical input from a source to a sensor. The state of polarization at the input to the sensor is unpredictably varying due to environmental perturbations, and because of randomly distributed birefringence along the fiber.

Several schemes have been devised to overcome the effects of polarization fading, including automatic polarization tracking, polarization diversity detection schemes based on output state of polarization selection, and use of polarization maintaining fiber. However, except for use of expensive polarization maintaining fiber, these techniques all rely on active control.

Recently, a new scheme allows passive, polarization-independent operation of a fiber interferometer. However, the new scheme can only be implemented with unpolarized sensing elements and only in a reflective configuration. This scheme cannot be used with polarized sensing elements. Also, this scheme requires that the signal from the sensing element return on the same fiber as the light from the source—an undesirable because of source light backscatter (noise) co-propagating with signal light.

As stated above, many fiber-optic and other transducers are polarization sensitive. If the incoming light does not reach the transducer in the correct polarization, then the light may be strongly attenuated after passing through the transducer (in the case of a polarizer), or the transducer may not have any useful effect on the light passing through, or some combination of both. Examples of polarization-sensitive transducer configurations include interferometric ones (Mach-Zender, Michelson, Fiber Fabry-Perot), polarimetric, waveguides (e.g. lithium niobate phase modulators), and Faraday rotator based sensors. All of these sensor configuration are sensitive to the input state of polarization and can be constructed to maintain a preferential input state of polarization.

SUMMARY OF THE INVENTION

Accordingly, an object of the invention is to counter polarization induced signal fading.

Another object is to do the foregoing by passive, rather than by active control.

Another object is to do the foregoing less expensively, especially without using extensive amounts of polarization maintaining fiber.

Another object is to provide a simple and inexpensive orthoconjugate reflector.

In accordance with these and other objects made apparent hereinafter, the invention concerns an apparatus and method employing a polarization beamsplitter and one or more non-reciprocal polarization rotators. The beamsplitter receives an input signal having some unspecified state of polarization, splits it into two output signals respectively polarized along the beamsplitter's principal orthogonal axes, and launches the output signals from a pair of output ports to a means for counter-propagating the output signals between the output ports. While being counter-propagated, the output signals are subjected to a non-reciprocal polarization rotator effective to cause both output signals to have the same state of polarization in the means counter-propagating.

Because both output signals are linearly polarized in the same direction in the means for counterpropagating, a polarization sensitive transducer can be oriented so that its preferred polarization axis matches that of the counterpropagating signals, making the transducer effectively polarization insensitive.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
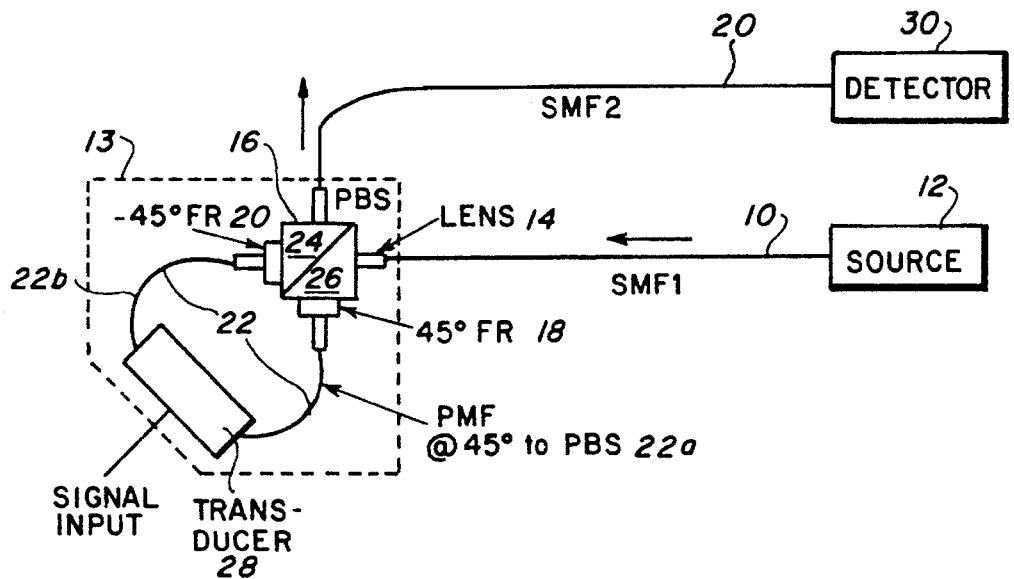
FIG. 1 is a schematic diagram of one embodiment of the invention.

Referring to the drawing figures, wherein like references correspond to like structure throughout the several views, FIG. 1 shows light from a polarized or unpolarized source 12 launched into a standard single mode optical fiber 10. The light traveling in fiber 10 toward module 13 assumes some state of polarization which is not known a priori. The light is preferably collimated, for example by GRIN lens 14, and split by polarization beam splitter 16; the horizontal state of polarization is directed to port 26 of beamsplitter 18, and the vertical state of polarization is directed through to the left of the figure to port 24. Faraday rotators 16, 20 rotate the states of polarization 45° clockwise (as observed looking in the direction of travel), and launch the signals in opposite directions on a principal axis of polarization maintaining fiber 22. Fiber 22 guides the light through any polarization sensitive transducer (modulator, detector, etc.) that might be present in fiber 22. The light in fiber 22 is "on axis" independent of the state of polarization that initially arrives at the beam splitter 14 because, by rotating the polarization, both signals exiting ports 24, 26 are rotated by 45°, and thus both signals are linearly polarized along the same major axis of polarization maintaining fiber 22 as they counterpropagate between ports 24, 26. This state of polarization will typically be a preferred one for the transducer 28.

Each of the respective outputs signals 24, 26 counterpropagates around 22 are rotated 45° counterclockwise, and thus return to beam splitter 16 in the same state of polarization that it initially arrived. Therefore, all of the light exits beamsplitter 16 via fiber 20, and travels to detector 30, where the influence of transducer 28 can be detected. That is, any horizontal component initially arriving at beamsplitter 16 is reflected down the page into 26, 18, 22(a), travels clockwise around the loop, arrives at beamsplitter 16 in the horizontal state of polarization, and is reflected up the page into fiber 20. Likewise, any vertical component initially arriving at beamsplitter 16 is transmitted through into loop 24, 20, 22(b), travels counterclockwise around the loop, arrives at beamsplitter 16 in the vertical state of polarization, and is transmitted up into fiber 20. Thus, a polarization insensitive modulator module 13 is formed by using a polarization sensitive modulator, two Faraday rotators, a polarization beamsplitter, optional collimating lenses, and a short length of polarization maintaining fiber. Additionally, the signal returning from sensing element 28 is not co-propagating with (Rayleigh) backscattered light from source 12. Thus the signal to noise ratio of the apparatus of FIG. 1 is not diminished.

Figure 2:
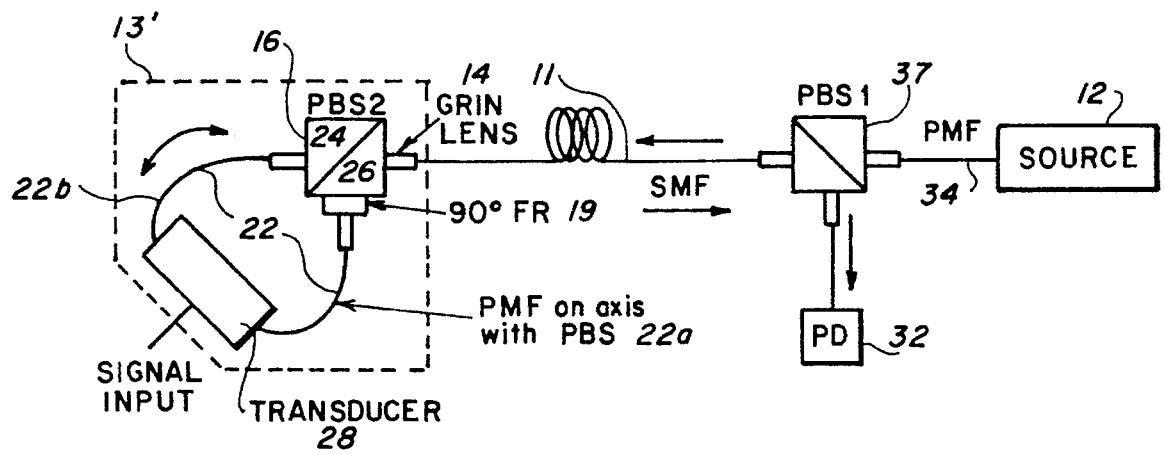
FIG. 2 is a schematic diagram of another embodiment of the invention.

If, however, one wishes to replace the double lengths of fibers 10, 20 with a single fiber, the embodiment of FIG. 2 permits this. Light from polarized source 12 is launched into a short length of polarization maintaining fiber 34. Fiber 34 is oriented so that the source light is transmitted through polarization beam splitter 37 so as to be launched into single mode fiber 11. In practice, fiber 11 may be very long (e.g. 10 km or more). The light traveling toward beamsplitter 16 converts into one state of polarization which is not known a priori. The light is split by polarization beam splitter 16 in the same manner as beamsplitter 16 of FIG. 1, the horizontal component being directed down to 19, and the vertical state of polarization being directed to the left of the figure. Faraday rotator 19 rotates the horizontal component by 90°, and launches it on a principal axis of portion 22a of fiber 22. Fiber 22 guides the light through any polarization sensitive transducer, etc., 28 which may be present. The light in fiber 22 is "on axis" regardless of the state of polarization that initially arrives at beamsplitter 16: the components launched into fiber portions 22a, b from output ports 24, 26 initially have polarizations 90° apart; rotator 19 puts both components on the same axis in fiber 22. After exiting transducer 28, the originally vertical state of polarization component is rotated 90° by rotator 19, and returns to beamsplitter 16 in the horizontal state of polarization. However, after exiting transducer 28, the originally horizontal state of polarization is on the same axis as the vertical component and so returns to beamsplitter 16 in the vertical state of polarization. Light traveling in both directions around the loop are rotated 90°, and so returns to beamsplitter 16 in the opposite state of polarization from that in which it initially arrived. Therefore, all of the light returning to beamsplitter 16 is in the opposite state of polarization. It is readily seen that the light returning to fiber 11 has a state of polarization orthoconjugate to that which originally entered. That is at any point in fiber 11 the returning light signal is in the orthogonal state of polarization at every point in fiber 11, including at the point of return to beamsplitter 37—similar to a Faraday rotator and mirror combination. Hence, the light arriving back at beamsplitter 37 is reflected down to photodetector 32. Thus, a polarization insensitive remote sensing module 13' is formed by using a polarization sensitive modulator, a Faraday rotator, two polarization beam splitters with optional collimating lenses, and short lengths of polarization maintaining fiber.

Figure 3:
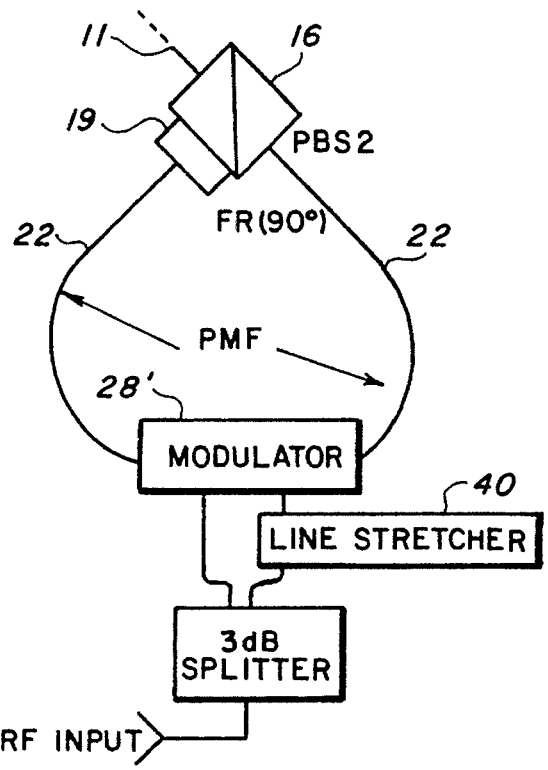
FIG. 3 is a schematic diagram of an embodiment of the invention using a microwave transducer.

FIG. 3 shows the embodiment of FIG. 2 used with a microwave modulator 28'. (The embodiment of FIG. 1 could as readily be used.) With Faraday rotator attached as on FIG. 2, each circulating component of light travels on the same birefringence axis of fiber 22. Therefore, any bidirectional modulator can be inserted at 28 and its operation will be independent of the input state of polarization. Unfortunately, microwave modulators often exhibit directional dependence above some characteristic frequency, $f_c$, due to traveling wave effects, i.e. deviations in phase between the electrical and optical signals in the modulator. However, the directional dependence can be removed with a symmetric device by synchronously driving the modulator in both directions (i.e. maintaining electrical path balance between the input electrical source and the optical-electrical interaction region). To maintain wideband operation, modulator 28' is preferably located at the appropriate midpoint of fiber 22, and any conventional means used for microwave path matching, preferably a simple line stretcher 40. At all microwave frequencies the light counterpropagating in fiber 22 will interact with the corresponding co-propagating microwaves. At frequencies less than $f_c$ the light will interact with both the co- and counter-propagating microwaves. The response of modulator 28' will then be doubled at low frequencies, but, when included in module 13', complete polarization independence is obtained.

Figure 4:
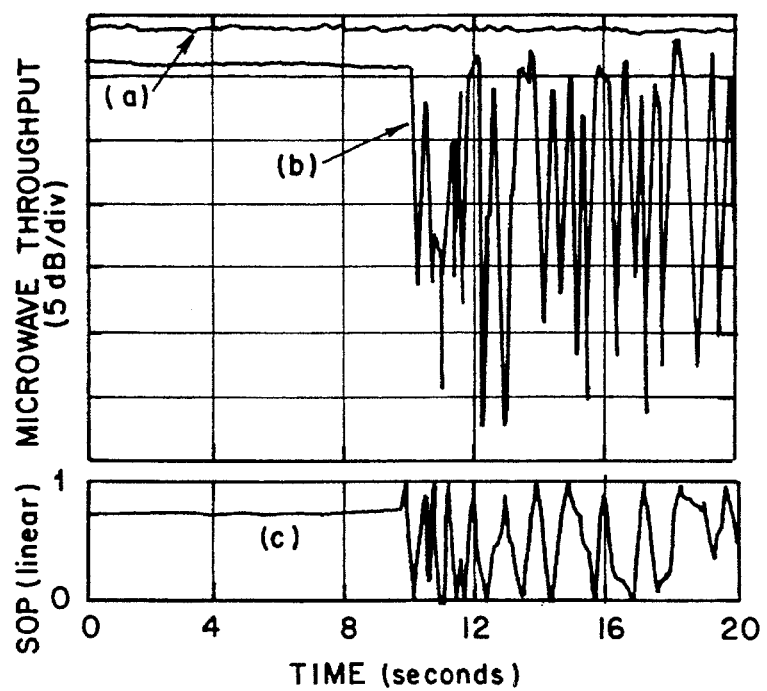
FIG. 4 is a graph presenting test results for a circuit like that shown in FIG. 3.

In an experimental implementation of the apparatus of FIGS. 2 and 3, the polarization-sensitive modulator 28' was a 31 Ghz GaAs-AlGaAs traveling-wave intensity modulator. The input state of polarization in fiber 11 was varied with a fiber loop controller (not shown), and modulated by a pick-off splitter (not shown) inserted between beamsplitters 37 and 16. FIG. 4 presents traces (a) and (b), which show the demodulated microwave at 12 GHz from a photodetector (not shown) with and without Faraday rotator 19 in place, respectively. Trace (c) is the input state of polarization on single mode fiber 11 as it varied over time. The variation in the microwave power was less than ±0.3 db with the loop 22, 19, 16, etc., in place. Because the circuit of FIGS. 2–3 causes modulator 28' to receive an optical input that is always linearly polarized about the modulator's preferable axis, the gain of the modulator remains relatively constant, despite variations in input states of polarization in fiber 11. Also, because one can place modulator 28' at the optical midpoint of fiber 22, and one can simultaneously path match the counter-propagating microwave input signals, the microwave modulation on the optical signals counter-propagating in loop 22 recombine in phase at beamsplitter 16. This makes the operation of modulator 28' relatively frequency independent, thus giving it wideband operation.

The invention has been described in what is considered to be the most practical and preferred embodiments. It is recognized, however, that obvious modifications to these embodiments may occur to those with skill in this art. As one example, although the foregoing deals primarily with optical signals, this is done by way of explanation rather than limitation, the invention is applicable to any polarizable signal in any medium. Accordingly, therefore, the scope of the invention is to be discerned solely by reference to the appended claims, wherein:

We claim:

1. An apparatus comprising:
    a polarization beamsplitter having two principal axes, said beamsplitter being effective to receive an input signal having a state of polarization and to split said input signal into two output signals respectively polarized along said principal axes, said beamsplitter further having a pair of output ports for launching said output signals from said beamsplitter, one each of said ports launching a respective one of said output signals;
    means for receiving said output signals and counterpropagating each of said output signals to the opposite one of said ports from which said each of said output signals was launched; and
    non-reciprocal polarization rotator means for causing said each of said output signals to have the same state of polarization in said means for receiving said output signals.

2. The apparatus of claim 1, wherein said rotator means, and said means for receiving said output signals, cooperate to cause said each of said output signals to arrive at said beamsplitter with the same state of polarization with which said beamsplitter launched said output signals.

3. The apparatus of claim 2, wherein said rotator means comprises a pair of oppositely oriented 45° polarization rotators, one each of said rotators being operatively located at a respective one of said ports, and said means for receiving said output signals, comprises a polarization maintaining optical fiber.

4. The apparatus of claim 3, wherein said means for receiving said output signals comprises a transducer, said transducer operates responsive to at least one of said output signals.

5. The apparatus of claim 2, wherein said means for receiving said output signals comprises a transducer, said transducer operates responsive to at least one of said output signals.

6. The apparatus of claim 1, wherein said rotator means, and said means for receiving said output signals, cooperate to cause said each of said output signals to arrive at said beamsplitter with a state of polarization such that the combination of said output signals is the polarization orthoconjugate of said input signal.

7. The apparatus of claim 6, wherein said means for receiving said output signals comprises a 90° polarization rotator located operatively at one of said ports, and said means for receiving said output signals comprises a polarization maintaining optical fiber.

8. The apparatus of claim 7, wherein said means for receiving said output signals comprises a transducer, said transducer operates responsive to at least one of said output signals.

9. The apparatus of claim 8, wherein said transducer is a microwave modulator.

10. The apparatus of claim 8, wherein said transducer is a microwave modulator adapted for modulating both said output signals.

11. The apparatus of claim 10, wherein said transducer is a traveling wave device adapted for simultaneous counterpropagation of said output signals within said device.

12. The apparatus of claim 6, wherein said means for receiving said output signals comprises a transducer, said transducer operates responsive to at least one of said output signals.

13. The apparatus of claim 1, wherein said at least one Faraday rotator is one rotator disposed at one of said output ports.

14. An optical processor comprising:
    a polarization beamsplitter having three ports, one of said ports being effective to receive an optical signal, the other two being effective as output ports;
    a polarization maintaining fiber connecting said output ports of said beamsplitter;
    at least one Faraday rotator disposed in said fiber.

15. The apparatus of claim 14, wherein said at least one Faraday rotator is a pair of Faraday rotators, one each of said rotators disposed at a respective one of said output ports.

16. A method, said method using an apparatus comprising a polarization beamsplitter having two principal axes and a pair of output ports, a waveguider, and a polarization rotator, said method comprising steps for:
    causing said beamsplitter to receive an input signal having a state of polarization, and to split said input signal into two output signals respectively polarized along said principal axes,
    launching said output signals from said beamsplitter, one each of said ports launching a respective one of said output signals;
    receiving said output signals and counterpropagating each of said output signals to the opposite one of said ports from which said each of said output signals was launched; and
    said steps for causing, launching, and receiving together causing said each of said output signals to have the same state of polarization in said waveguider.

* * * * *